Sept. 23, 1969  HO CHOW ET AL  3,468,562
SPEED SLIP-ON HOSE COUPLER LOCKED BY FLUID PRESSURE
Filed Sept. 8, 1967  3 Sheets-Sheet 1
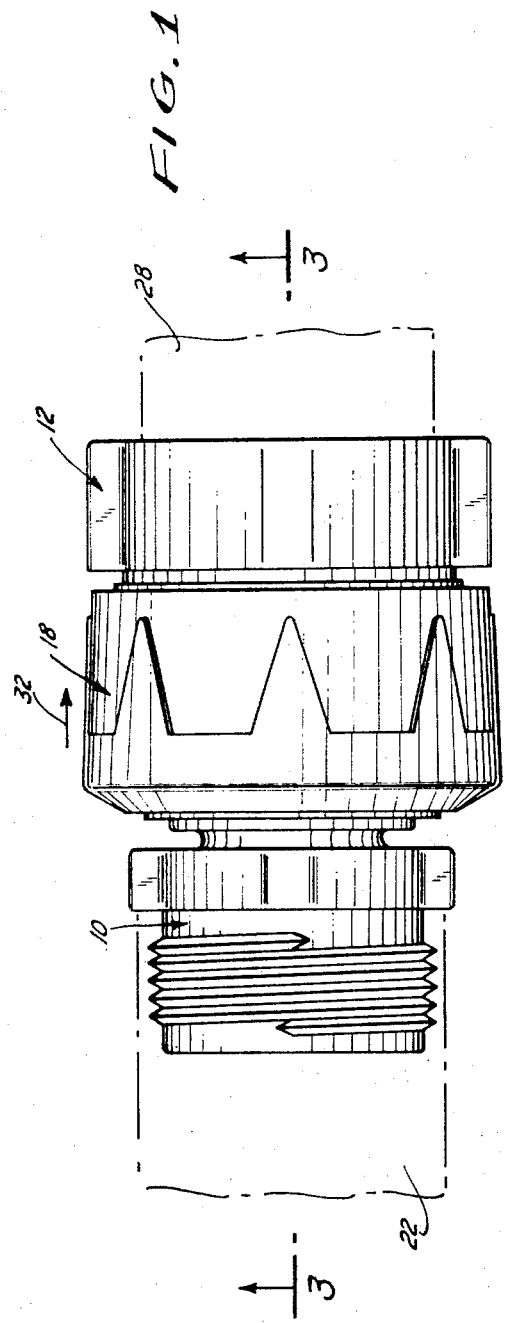
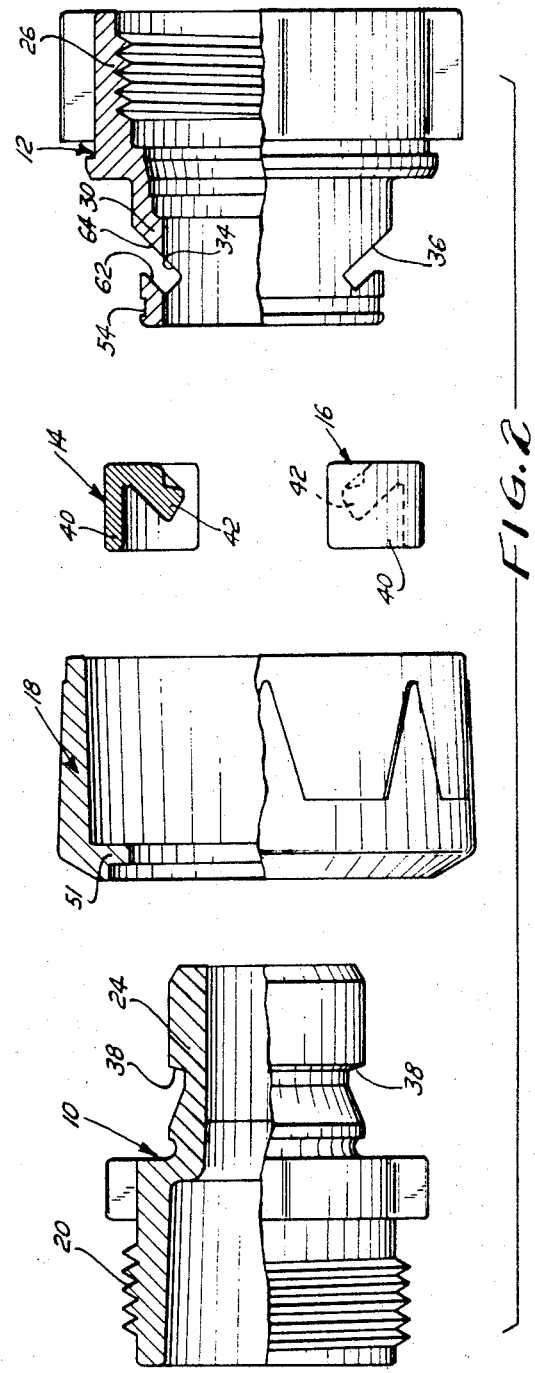
INVENTOR
HO CHOW
GEORGE D'ANGELO
BY
James & Franklin
ATTORNEYS

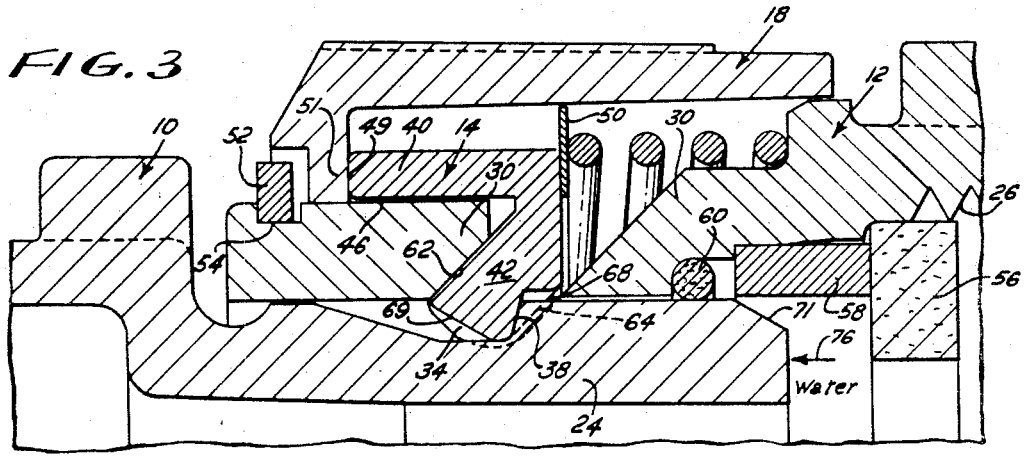
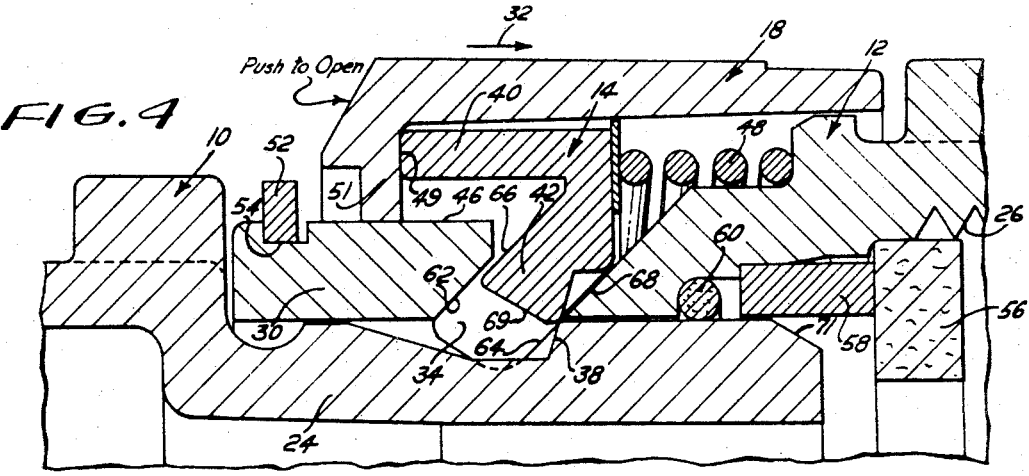
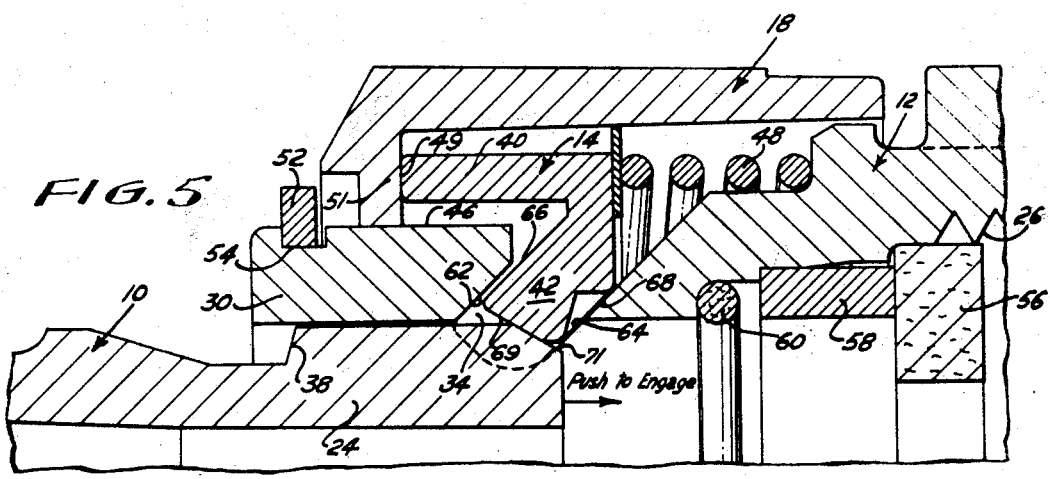

Sept. 23, 1969     HO CHOW ET AL     3,468,562
SPEED SLIP-ON HOSE COUPLER LOCKED BY FLUID PRESSURE
Filed Sept. 8, 1967     3 Sheets-Sheet 3
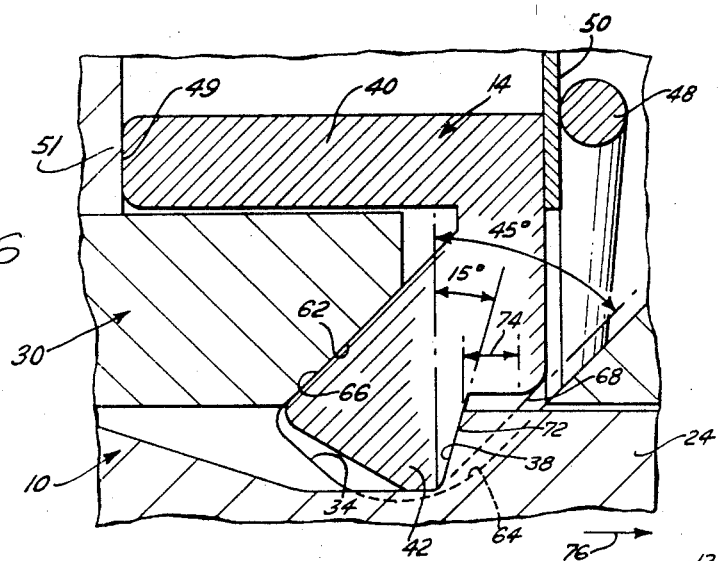
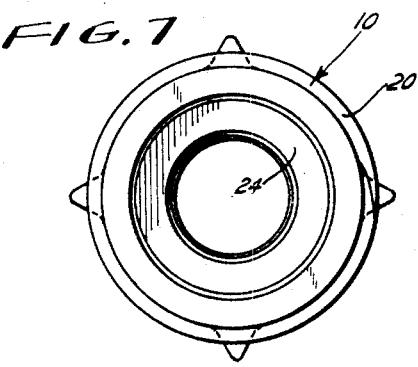
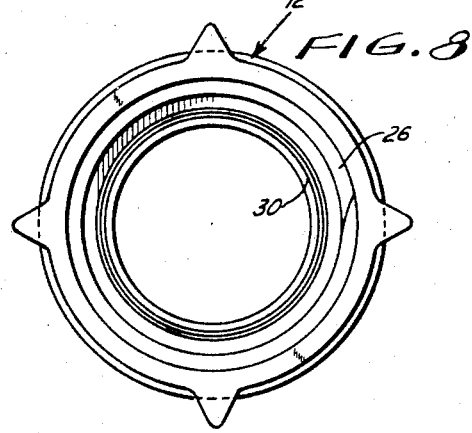
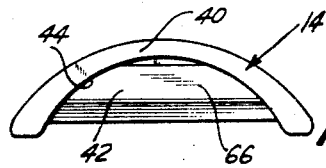
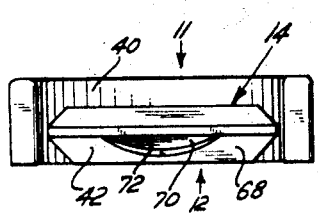
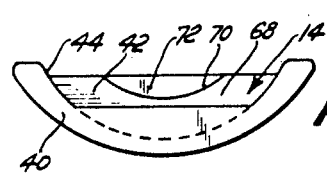
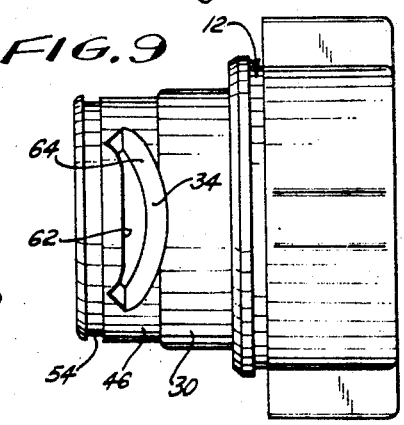
INVENTOR
HO CHOW
GEORGE D'ANGELO
BY
ATTORNEYS United States Patent Office 3,468,562
Patented Sept. 23, 1969

3,468,562
SPEED SLIP-ON HOSE COUPLER LOCKED BY FLUID PRESSURE
Ho Chow, River Edge, and George D'Angelo, Paterson, N.J., assignors to International Patent Research Corp., Moonachie, N.J., a corporation of New York
Filed Sept. 8, 1967, Ser. No. 666,265
Int. Cl. F16l 35/00, 27/00
U.S. Cl. 285—81        13 Claims

ABSTRACT OF THE DISCLOSURE

A speed slip-on type of hose coupler structured to enable ready coupling and uncoupling of the male and female coupler bodies by way of an interlocking means for the coupler bodies and a releasing device for the interlocking means, so constructed that while normally in the absence of a water pressure in the coupler the releasing device may be readily manually operated to a coupler disconnecting or uncoupling condition, the presence of a water pressure in the coupler effectively resists operation of the releasing device and thereby effectively prevents the disconnection or the uncoupling of the coupler.

---

This invention relates to a hose coupler and more particularly to a hose coupler of the type in which the male hose attachable body is speedily attachable to the female hose attachable body by the male body being received by and locked to the female body by the telescoping action of merely pushing the male body into the female body with a plug-in or slip-on fit.

In speed attachable hose couplers of this type the interlocking coupling of the male and female bodies is obtained by telescoping the male body into the female body, and uncoupling or disconnection of the male and female bodies is effected by a releasing device associated with the coupling which when manually operated permits the unplugging of the coupler bodies.

The prime object of the present invention is the provision of a speed slip-on or plug-in hose coupler of this type embodying a simplified as well as improved structure when compared to known or prior slip-on hose couplers and which simplification and improvement of the structure derives from the following designated characteristics of the coupler of the invention:

(1) The interlocking means of the coupler and the releasing device therefor are so structured and functionally associated that while normally in the absence of a water pressure in the coupler the releasing device may be readily manually operated to a coupler disconnecting condition, the presence of a water pressure in the coupler effectively resists operation of the releasing device and thereby effectively prevents the disconnection or the uncoupling of the coupler; and (2) The coupler is simplified to the point where the male body is a one-piece member, the female body is a one-piece member, the releasing device is a one-piece member, and each of the locking means comprising a pair of locking elements is a one-piece member; the said members being moreover so associated and assembleable that each of them may be made as a molded plastic element.

To the accomplishment of the foregoing objects and such other objects as may hereinafter appear, our invention relates to the speed slip-on hose coupler as sought to be defined in the appended claims taken together with the following specification and the accompanying drawings, in which:

FIG. 1 is an elevational view of the hose coupler of the invention shown in assembled condition;

FIG. 2 is an exploded or disassembled view of the essential parts thereof with parts shown in section;

FIG. 3 is an elevational view of all of the parts thereof, taken in vertical cross-section in the plane of the line 3—3 of FIG. 1 (parts being broken away) showing the coupler in assembled connected position;

FIG. 4 is a view thereof similar to FIG. 3 and showing the same in a position for effecting the uncoupling or disconnection of the coupler parts;

FIG. 5 is a view similar to FIG. 3 and showing the position of the parts during the step of coupling the parts together;

FIG. 6 is a fragmentary and enlarged view of parts shown in FIG. 3 explanatory of the action of the interlocking means and action of the coupler;

FIG. 7 is a rear elevational view of the male body of the coupler;

FIG. 8 is a rear elevational view of the female body of the coupler;

FIG. 9 is a plan view of the female body of the coupler;

FIG. 10 is a bottom elevational view shown to a somewhat enlarged scale of one of the pair of locking elements of the coupler;

FIG. 11 is a front elevational view thereof as seen from FIG. 10; and

FIG. 12 is a rear elevational view thereof as seen from FIG. 10.

Referring now more in detail to the drawings and having reference first to FIGS. 1 and 2 thereof which show the main parts of the coupler in assembled and exploded conditions, the hose coupler comprises a male body generally designated as 10, a female body generally designated as 12, locking means comprising a pair of locking elements generally designated as 14 and 16 and a lock releasing device generally designated as 18.

The male body 10 formed integrally with an externally threaded part 20 adapted to be coupled to a hose section 22 (indicated in dot and dash lines) is formed with a nipple 24, and the female body 12 formed integrally with an internally threaded part 26 adapted to be coupled to a hose section 28 (indicated in dot and dash lines) is formed with a sleeve 30 for receiving the nipple 24 with a plug-in or slip-on fit. The releasing device 18 comprises a collar in the form shown mounted on the female body 12 normally assuming the coupler connecting position shown in FIG. 1 of the drawings and axially slidable on the female body 12 in the direction indicated by the arrow 32 (FIG. 1) to a coupler disconnecting position.

Locking means for interlocking the male and female bodies as the male body is plugged in or slipped into the female body comprises the two locking elements 14 and 16 mounted in openings 34 and 36 formed in the sleeve 30 and movable therein between locking and unlocking positions as hereinafter more fully described and a detent part 38 formed in the nipple 24, which detent part is engageable and disengageable by the locking elements. Referring to FIGS. 9 to 12 of the drawings each of the locking elements comprises an arcuate piece 40 and a locking piece 42 internally bridging the same, both shaped as best shown in FIGS. 10 to 12 of the drawings, the arcuate piece having an internal diameter 44 the same as the external diameter 46 of the portion of the sleeve 30 in which the openings 34 (FIG. 9) are formed, the structure being such that the locking piece 42 fits into the opening 34 for movement therein between coupler locking and unlocking positions.

The male body 10, the female body 12, the locking elements 14 and 16 and the collar 18 each comprises a one-piece member, each of which may be made as a molded plastic member. These parts may be readily assembled by hand (without tools), in the assembling of which there is inserted a compression spring 48 acting on the washer 50 engaging one end of the locking element 14 (and 16) as depicted in FIGS. 3 to 5 of the drawings, the other end of the locking element being engaged at 49 by a flange part 51 formed in the collar 18. To hold the parts in assembled condition there is provided a retaining ring 52 (which also may be made of a plastic) seated in a groove 54 in the front end of the sleeve 30. To complete the assembly the female body 12 is provided with a hose washer 56, a spacer 58 and an O-ring 60.

The parts of the interlocking means, namely the locking parts 42 (of the locking elements 14 and 16), the openings 34 and 36 in the female body through which these locking parts move, and the detent 38 of the male body are specially configured to carry out the performance and the functions heretofore described. Referring to FIG. 6 where this is best illustrated, the side faces 62 and 64 of the opening 34 (and correspondingly of the opening 36), and the contiguous surface contacting side faces 66 and 68 of the locking parts 42 are formed so that they are at a major angle, and preferably at an angle in the range of 45° to a plane normal to the coupler axis as clearly indicated in FIG. 6 of the drawings. Centrally of the face 68 of the locking part 42, there is a depressed conical area 70 (see also FIGS. 10 and 11) formed with a face 72 which is at a minor angle, and preferably at an angle in the range of 15° to the plane normal to the coupler axis, as is also clearly indicated in FIG. 6 of the drawings, which face 72 has a surface contact with the face of the detent 38 of the male body. A surface contact is also formed at 49, 51 between the locking element 14 (and 16) and the collar 18. Another surface contact 69, 71 is formed between the bottom of the locking part 42 and the input end of the nipple.

Cooperating with these specially configured parts, the nipple 14 of the male body 10 and the sleeve 30 of the female body 12 are structured so that the sleeve 30 receives the nipple with a slip-on fit to the locking position of the coupler as depicted in FIG. 3 of the drawings and also a distance beyond the locking position as depicted in FIG. 4 of the drawings, this distance being indicated in FIG. 6 of the drawings by the double arrow 74. From FIG. 6 it will be seen that movement of the locking element 14 out of the female body opening 34 will, by the cooperation or mating of the interfaces 72 (of the locking element) and 38 of the male body detent, cause the male body 10 to move in the direction indicated by the arrow 76 a distance beyond the illustrated locking position a distance equal to the distance 74.

With this described structure the following operations depicted in FIGS. 3, 4 and 5 are obtainable:

(1) To couple or connect the coupler bodies the male body nipple 24 is pushed or plugged into the female body sleeve 30 in the direction shown in FIG. 5 of the drawings. By the interengagement between the faces 69, 71 of the locking part 42 and the input end of the nipple 24 the locking elements 14 are moved radially outwardly along a path at 45° to the plane normal to the coupler axis against the action of the spring 48, the locking elements then riding on the cylindrical surface of the nipple 24 as the nipple is pushed further into the sleeve until the condition shown in FIG. 3 is reached, at which time the locking elements 14 snap into their locking positions shown in FIG. 3 of the drawings under the expansion influence of the spring 48. The parts of the coupler are then held in their connected or coupled condition.

(2) To normally disconnect or uncouple the coupler bodies the releasing collar 18 is manually moved in the direction indicated by the arrow 32 in FIG. 4 of the drawings. The interface engagement 49, 51 between the arcuate part 40 of the locking element 14 and the flange 51 of the collar 18 when the releasing collar 18 is thus moved, causes the locking elements 14 to move from the position shown in FIG. 3 to that shown in FIG. 4 against the action of the spring 48, thus releasing or unlocking the male body nipple (as shown in FIG. 4 of the drawings), thereby permitting the male body 10 to be withdrawn and disconnected from the female body 12. This action or operation is free to take place normally in the absence of a water pressure in the coupler; and (3) In the presence of a water pressure in the coupler, the water pressure being active on the male body 10 as indicated by the arrows 76 in FIG. 3 of the drawings, the operation of the releasing collar 18 is effectively resisted thereby effectively preventing the disconnection or the uncoupling of the coupler. This is due to the angular arrangement of the interfaces 72 of the locking part 42 and 38 of the nipple detent coupled with the fact that to disconnect or uncouple the parts the nipple has to be moved against the water pressure in the coupler a distance beyond the locking position, namely the distance indicated by the double arrow 74. In opening the coupler by the movement of the collar 18 to move the locking elements from the position shown in FIG. 3 to that shown in FIG. 4, the male body 10 must therefore be moved against the force exerted on itself by the internal water pressure the said distance 74. This action of interference between the locking elements and the male body effectively prevents the opening of the coupler while the coupler is under water pressure internally. The effort required to push or move the collar 18 for disconnection or uncoupling of the parts increases as the 15° angle (FIG. 6) decreases. With the 45° and 15° arrangement and the required movement of the male body as described, it is found almost impossible to push or move the collar 18 to decouple the parts when the internal water pressure is 20 p.s.i. or over.

The structure and operation of the speed slip-on hose coupler of the invention and the functioning thereof as well as the several advantages resulting from the designed construction will in the main be fully apparent from the above detailed description thereof.

We claim:

1. A speed slip-on hose coupler comprising a male hose attachable body, a female hose attachable body, the male body being formed with a nipple and the female body being formed with a sleeve for receiving the nipple with a slip-on fit to and beyond a locking position, locking means for interlocking the male and female bodies comprising locking elements mounted in openings formed by wall portions of said sleeve and movable therein between locking and unlocking positions and a detent part formed in said nipple engageable and disengageable by said locking elements, a collar mounted on said female body and having a part engageable with said locking elements, the collar being axially slidable on the female body between coupler connecting and disconnecting positions, a compression spring housed between the female body and the collar active on the locking element to move the same to their locking positions to effect the coupler connection and active on the collar via the locking elements to move the collar to its coupler connecting position, reverse movement of the collar to its coupler disconnecting position effecting the movement of the locking elements against the action of said spring to their unlocking position, the said locking elements and the nipple detent being formed with angularly arranged interfaces such that the last mentioned movement of the collar produces an inward movement of the nipple in the sleeve a distance beyond the locking position due to the engagement at said interfaces between the locking elements and said detent, which in the presence of a water pressure in the coupler effectively resists such movement to effectively prevent the disconnection of the coupler.

2. The speed slip-on hose coupler of claim 1 wherein the locking elements are movable in the sleeve openings along a path at a major angle to a plane normal to the coupler axis and the interfaces of the nipple detent and the locking elements are at a minor angle to the plane normal to the coupler axis.

3. The speed slip-on hose coupler of claim 2 wherein the said major angle is in the range of 45° and the minor angle is in the range of 15°.

4. The speed slip-on hose coupler of claim 1 in which the male body is a one-piece member, the female body is a one-piece member, the collar is a one-piece member, there being a pair of locking elements disposed in diametrical relationship, each being a one-piece member.

5. The speed slip-on hose coupling of claim 4 in which the male body, the female body, the collar and the locking elements each comprises a one-piece molded plastic member.

6. A speed slip-on hose coupler on the type comprising a male hose attachable body, a female hose attachable body, the male body being formed with a nipple and the female body being formed with a sleeve for receiving the nipple with a slip-on fit, with locking means for interlocking the male and female bodies comprising locking elements mounted in openings formed by wall portions of said sleeve and movable therein between locking and unlocking positions and a detent part formed in said nipple engageable and disengageable by said locking elements, with a collar mounted on said female body and having a part engageable with said locking elements, the collar being axially slidable on the female body between coupler connecting and disconnecting positions, with a compression spring housed between the female body and the collar active on the locking elements to move the same to their locking positions to effecst the coupler connection and active on the collar via the locking elements to move the collar to its coupler connecting position, and reverse movement of the collar to its coupler disconnecting position effecting the movement of the locking elements against the action of said spring to their unlocking position, characterized by said male body nipple being movable into said female body sleeve to and a distance beyond the said locking position, the said locking element and the nipple detent being formed with angularly arranged interfaces such that the said reverse movement of the collar produces an inward movement of the nipple in the sleeve a distance beyond the locking position due to the engagement at said interfaces between the locking elements and said detent, which in the presence of a water pressure in the coupler effectively resists such movement and effectively prevents the disconnection of the coupler.

7. The speed slip-on hose coupler of claim 6, further characterized by the locking elements being movable in the sleeve openings along a path at a major angle to a plane normal to the coupler axis and the interfaces of the nipple detent and the locking elements being at a minor angle to the plane normal to the coupler axis.

8. The speed slip-on hose coupler of claim 7 wherein the said major angle is in the range of 45° and the minor angle is in the range of 15°.

9. The speed slip-on hose coupler of claim 6 further characterized by the male body being a one-piece member, the female body being a one-piece member, the collar being a one-piece member, there being a pair of locking elements disposed in diametrical relationship, each being a one-piece member.

10. The speed slip-on hose coupling of claim 9 in which the male body, the female body, the collar and the locking elements each comprises a one-piece molded plastic member.

11. A speed slip-on hose coupler comprising a male hose attachable body, a female hose attachable body, the male body being formed with a nipple and the female body being formed with a sleeve for receiving the nipple with a slip-on fit to and beyond a locking position, locking means for interlocking the male and female bodies comprising spring actuated locking elements mounted in openings formed by wall portions of said sleeve and movable therein between locking and unlocking positions and a detent part formed in said nipple engageable and disengageable by said locking elements, a releasing device mounted and movable on the female body between coupler connecting and disconnecting positions, movement of the releasing device to its coupler connecting position acting to permit the spring actuated locking elements to move to their locking positions, and reverse movement of the releasing device to its coupler disconnecting position acting on the locking elements to move the same against the spring action to their unlocking position, the said locking elements and the nipple detent being formed with angularly arranged interfaces such that the last mentioned movement of the releasing device produces an inward movement of the nipple in the sleeve a distance beyond the locking position due to the engagement at said interfaces between the locking elements and said detent, which in the presence of a water pressure in the coupler effectively resists such movement to effectively prevent the disconnection of the coupler.

12. The speed slip-on hose coupler of claim 11, wherein the locking elements are movable in the sleeve openings along a path at a major angle to a plane normal to the coupler axis and the interfaces of the nipple detent and the locking elements are at a minor angle to the plane normal to the coupler axis.

13. The speed slip-on hose coupler of claim 12, wherein the said major angle is in the range of 45° and the minor angle is in the range of 15°.

References Cited

UNITED STATES PATENTS

| | | | |
|---|---|---|---|
| 2,069,434 | 2/1937 | Eastman | 285—277 X |
| 2,225,610 | 12/1940 | Christian | 285—277 |
| 2,631,872 | 3/1953 | Wurmser | 285—277 |
| 2,913,263 | 11/1959 | Zajac | 285—317 X |
| 3,177,018 | 4/1965 | Goodwin | 285—277 |
| 3,334,860 | 8/1967 | Bolton | 285—277 X |

CARL W. TOMLIN, Primary Examiner

D. W. AROLA, Assistant Examiner

U.S. Cl. X.R.
285—277, 423